United States Patent Office.

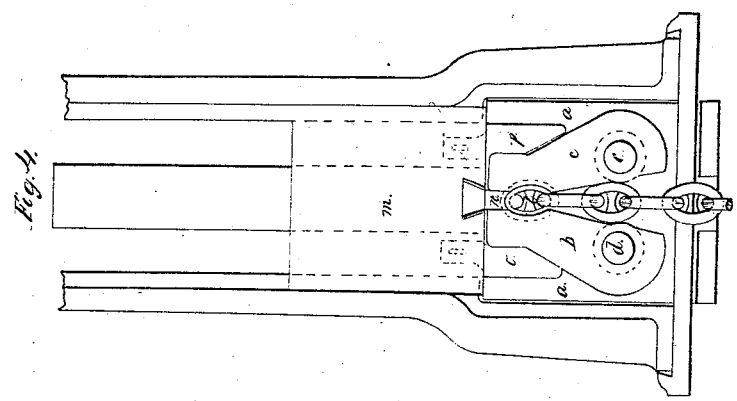

ALFRED HOMFRAY, OF WITLEY LODGE, ENGLAND.

Letters Patent No. 70,845, dated November 12, 1867; patented in England, April 8, 1865.

---

IMPROVED MACHINE FOR MAKING THE LINKS OF CABLE AND OTHER CHAINS.

---

*The Schedule referred to in these Letters Patent and making part of the same.*

---

TO ALL TO WHOM IT MAY CONCERN:

Be it known that I, ALFRED HOMFRAY, of Witley Lodge, in the parish of Halesowen, in the county of Worcester, England, gentleman, a subject of the Queen of Great Britain, have invented or discovered new and useful "Improvements in the Mode of Making or Forming the Links of Iron or Steel Chains and Chain Cables, and for Machinery to be used therein;" and I, the said ALFRED HOMFRAY, do hereby declare the nature of the said invention, and in what manner the same is to be performed, to be particularly described and ascertained in and by the following statement thereof; that is to say—

My invention consists of a rapid and inexpensive method of manufacturing iron or steel chains and chain cables, which has the following advantages, namely: each link, whatever its thickness, has a true and regular shape; the link is turned or shaped and the weld effected at one heat. The weld is made by one blow, and is as strong as or stronger than any other part of the link. I can at will secure an extra thickness of metal at the weld, and also weld the link on the top, the side, or the shoulder. Iron and steel chains and chain cables are mostly made by hand labor. The link is heated several times in making the scarf, turning or shaping the link, and welding it, and the weld is often imperfect, from the metal having been burnt or crystallized by repeated blows of the hammer whilst cooling. According to my invention I heat the link but once, and weld it at one blow, and thus obviate these defects. I can also make a chain or chain cable of any strength, as readily as the usual sizes, by using a more powerful machine. I can weld with any kind of joint, but prefer a butt or straight joint. The mode by which I form a chain or cable is as follows: I cut cylindrical bars of iron or steel of the required size into straight pieces, each sufficient to form a link. I heat the ends of each piece to a welding heat in a fire with a double blast, or I heat the metal bars in a close furnace in which are placed hollow fire-bricks, each shorter than the bars to be heated. The bars are inserted in these hollow bricks, so that the middle of the bar is kept at a red heat, while the ends only are raised to a welding heat. When the ends of the bar are at a welding heat I place the bar across the opened jaws of the machine hereinafter described. I let a shaft or ram of the said machine fall and cause the bottom of a mandrel upon the said ram to strike the middle of the heated bar and drive it downwards, and at the same time close the jaws upwards on each side and force the metal to clip the oval mandrel. I then let a welding-hammer fall, the die at the bottom of which strikes the two ends of the heated metal at their junction and welds them. I raise the shaft or ram and welding-hammer, and remove the link from the mandrel, and cut off or smooth over any surplus metal which has escaped between the mandrel and die. I thread another heated bar through the last-formed link, and form another link, in the manner before described, and so on until the chain or cable is completed. When making stud-cables, I put the stud into an aperture or groove cut across the face of the mandrel, and then close the link upon it at one operation.

In order that my improvements may be better understood, I will now proceed to describe, with reference to the accompanying drawing, the machinery which I employ in carrying my invention into effect.

Figure 1 represents an elevation of one side, and

Figure 2 an elevation of the other side of the said machine, the parts being in position to commence the making of a link of a stud-chain or cable.

Figure 3 is an edge view of the same, and

Figure 4 represents the same elevation as fig. 1, after a link has been formed by the machine.

The same letters of reference indicate the same parts in each figure.

The said machinery consists of an anvil, $a$, on the face of which are fixed two iron or steel plates or jaws, $b\ c$, working on axles $d\ e$. The inside edges of the plates or jaws $b\ c$ are grooved or shaped as indicated in dotted lines, to the oval figure of the sides of the links to be made. When closed they form a hollow oval frame fitting the exterior of the proposed link, except at the top, where they do not meet, to admit the passage through them of the welding-die hereinafter described. A space is also left between the jaws at bottom, for the passage of the link last formed. The jaws close upwards, and are so centred that in closing they clip the heated iron or steel rod $f$ placed upon the anvil $a$, and force it to assume the shape of the proposed link. When opened the jaws allow the chain cable, as it is made, to pass freely between them. At the back of the metal frame or anvil $a$ are two metal tappets or reversed jaws or levers, $b^2\ c^2$, connected with the front iron or steel plates or jaws $b\ c$, before described, by the axles $d\ e$. These tappets or levers $b^2\ c^2$, when struck by the sliding shaft or ram next described, force the front jaws $b\ c$ together. Above, and into the centre of the anvil, a metal shaft or ram, $g$, is made to slide up and down, the top of which shaft or ram works in a frame, and the bottom of which is bevelled to fit the tappets or levers $c^2\ b^2$. This shaft or ram, on falling, strikes the tappets or levers $c^2\ b^2$, and by its weight and momentum closes the jaws $b\ c$. In the front of the sliding shaft or ram $g$ a mandrel or oval metal plate, $h$, is inserted or fixed, the said mandrel being shaped to the size of the inside of the link to be made, and grooved at the top, to receive half the thickness of the link. This mandrel $h$ has an aperture or cross-groove, $i$, in the bottom, which receives the top of the last-formed link, (see fig. 4.) The mandrel has also a groove, $k$, across its face, to receive the stud $l$ when links for stud-cables are being made. The mandrel $h$ is movable, and can be reversed when it is required to weld the link at the side or on the shoulder. The mandrel $h$ stands out from the face of the sliding shaft or ram $g$, so that as the said shaft or ram $g$ falls, the bottom of the mandrel $h$ strikes the heated rod $f$ and drives it downwards between the jaws $b\ c$. On the sliding shaft or ram $g$, but working independently thereof, another shaft or ram, $m$, slides, which I term the welding-hammer. At the bottom of the welding-hammer $m$ a movable die, $n$, is fixed, which fits the aperture between the top of the jaws $b\ c$, and when the welding-hammer $m$ falls, the said die $n$ strikes the two ends of the heated bar and welds them on the top of the mandrel $h$. The die $n$ is grooved to half the diameter of the thickness of the link. The welding-hammer $m$ has also attached to it two clips or pieces of metal, $o\ p$, which, when the hammer $m$ falls, clip the outside of the jaws $b\ c$, and hold them firmly against the link. The machine is so constructed that the sliding shaft or ram $g$ falls before the welding-hammer $m$. The manner in which the falling mandrel $h$ doubles the heated bar $f$, and the jaws or plates $b\ c$ close upon and shape the bar into an open link, and the die $n$ finally welds the ends of the link upon the top of the mandrel, will be readily comprehended by an examination and comparison of figs. 1 and 4 of the drawing. Both the sliding shaft or ram $g$ and the welding-hammer $m$ rest on the anvil $a$. They are lifted independently by cams or other lifting machinery now in use, and the link is bent and welded by their weight and momentum. The whole machine is framed together. The jaws or plates $b\ c$, ram $g$, and mandrel $h$, and parts connected with the same, may be used for fashioning or shaping the bars of iron or steel into open or unwelded links, independently of the welding-hammer $m\ n$ for welding the links. The unwelded links made by the said machinery may be welded by hand or otherwise.

Having now described the nature of my invention, and the manner in which the same is to be performed, I wish it to be understood that I do not limit myself to the precise details herein described, and illustrated in the drawing, as the same may be varied without departing from the nature of my invention; but

I claim as my invention—

1. The sliding shaft or ram, and mandrel which it carries, in combination with the anvil and the jaws for holding the link, and tappets for closing said jaws, substantially as and for the purposes herein shown and described.

2. The combination, with the sliding shaft or ram and its mandrel, of the welding-ram or hammer and die, arranged and mounted in the frame of the machine, substantially as and for the purposes set forth.

3. The combination of the mandrel, its shaft, and the welding-hammer and die, with the anvil, link-holding jaws, and tappets by which said jaws are closed, substantially as herein shown and specified.

ALFRED HOMFRAY. [L. S.]

Witnesses:
RICHARD SKERRETT, 7 *Cannon Street, Birmingham.*
T. TUTIN, 7 *Cannon Street, Birmingham.*